Feb. 16, 1960    A. A. HOOD    2,925,179
ROTARY JIG AND METHODS FOR TREATING IRON ORE
Filed May 27, 1955

Alva A. Hood
INVENTOR.

BY

ATTORNEYS

United States Patent Office 2,925,179
Patented Feb. 16, 1960

2,925,179

ROTARY JIG AND METHODS FOR TREATING IRON ORE

Alva A. Hood, Idaho Springs, Colo.

Application May 27, 1955, Serial No. 511,500

14 Claims. (Cl. 209—455)

This invention relates to methods of treating solids in liquids and to apparatus for concentrating, desliming and classifying solids in liquids.

The present invention is particularly adapted for, but not limited to, a treatment of materials in finely divided condition, particularly products screened to a −10 mesh size range. As an example, the invention may be utilized in treating the tailings of taconite ore processing plants in which the ore contains such a small amount of magnetic material that it is not feasible to attempt its recovery with magnetic separators. Usually the tonnage capacity of such plants is so large that a considerable quantity of valuable product is wasted during a seasonal operation.

The apparatus of the present invention may be classed as a rotary jig but differs from the usual jigging operation in that the heavier constituent is not discharged to the atmosphere or into a static body of liquid. In the practice of the present invention, a settled product is removed in an induced flow, preferably at an elevated point of discharge, by the action of a diaphragm pump. A hydraulic pulsation is utilized to provide the jigging action or teeter effect and the pulsations are directed or restricted at the lower end of the settling zone to produce an intermittent upcast flow which is finally dissipated in a body of material moving under centrifugal influence and maintained in a relatively high density condition.

As a consequence of these variations from the usual procedures, it is possible to treat an ore pulp or the like having constituents of substantially different specific gravity or in a substantial size range to obtain a clean concentrate or a closely sized end product. The practice of the invention will be best understood by reference to the accompanying drawings.

Figure 1:
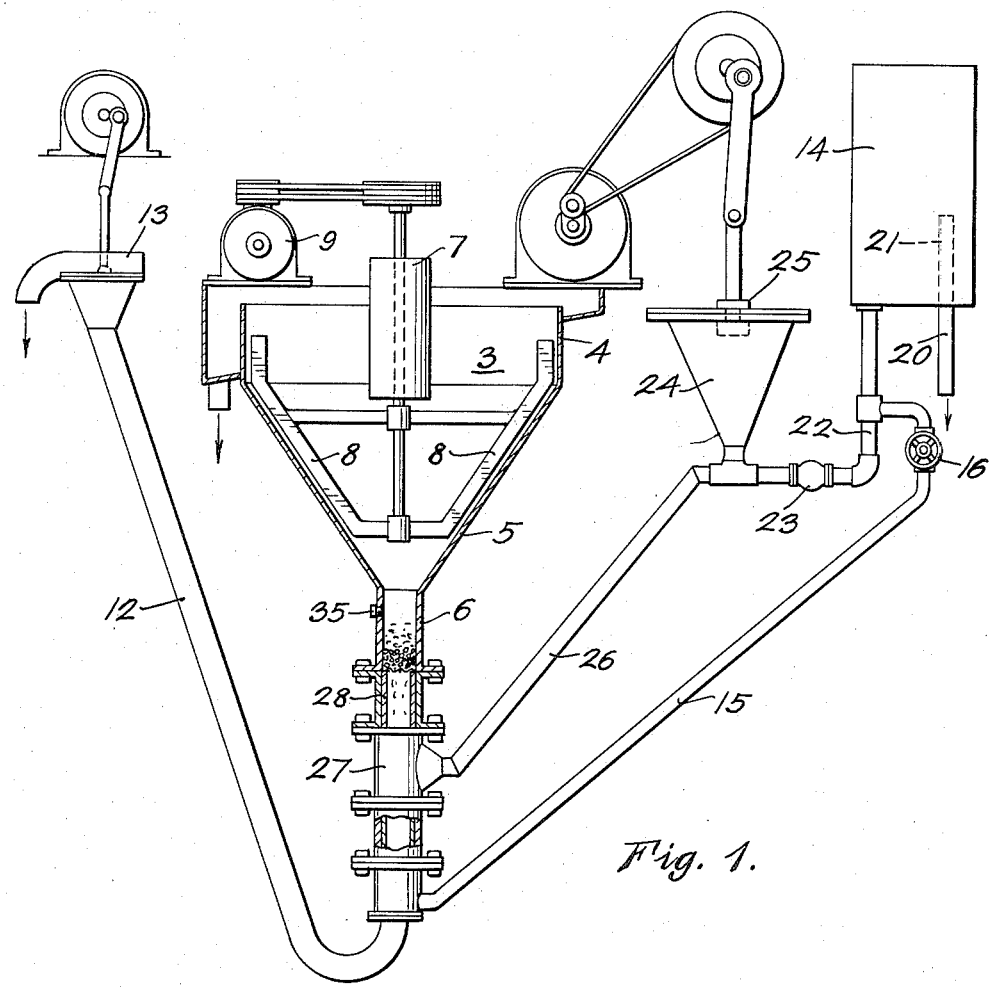
Fig. 1 is a vertical central section through a treatment tank embodying features of this invention with associated parts shown in elevation.

As shown in Fig. 1, the apparatus comprises a cylindrical tank 3 having a circumferential overflow 4 at its top and a conical bottom portion 5 terminating at its lower end in a tubular extension portion 6 constituting the vertical treatment zone which will be described more fully hereinafter. Feed is supplied to the top of tank 3 through a central inlet member 7 and the contents of the tank are maintained in centrifugal movement by the rotation of an impeller 8 driven by a motor and speed reducer unit 9.

In preferred practice, the tubular extension 6 is formed by a series of interconnected flanged members with the final discharge moving through an upstanding conduit 12 connected with a diaphragm pump unit 13 of any standard type. Examples of such pumps are shown and described in Taggart "Handbook of Mineral Dressing," 1947 edition, Section 18–89. A reservoir 14 supplies water through a bypass line 15 into the lower end of line 12, and a valve 16 is provided to control the volume of water so delivered. Water is delivered continuously into reservoir 14 from a suitable source (not shown) and such water is removed through an outlet 20 and may be recirculated where water conservation is required. The head of water above outlet 20 may be selectively varied by changing the overflow level of a tube 21 in telescoping arrangement with outlet member 20.

The main flow of water from reservoir 14 passes through a line 22 preferably containing a check valve 23 and fills a displacement unit 24 of a pulsator mechanism 25 from which it passes through a line 26 into a section of the vertical extension constituting the back wash inlet 27 of the unit. An interchangeable bushing member 28 is located in the extension portion above the inlet 27 and, through selective variation of the bore of the bushing, it is possible to regulate the velocity of the pulsating flow.

Figure 2:
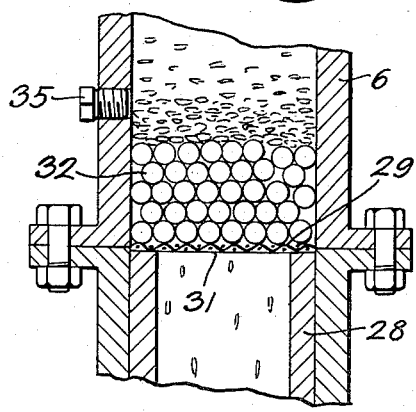
Fig. 2 is an enlarged fragmentary section of the teeter bed shown in Fig. 1.

For most treatments, I prefer to locate a teeter bed 29 intermediate inlet 27 and the bottom outlet of tank 3. The teeter bed, as shown in Fig. 2, comprises a screen 31 supporting a bed of shot 32. In a typical installation, a ten mesh screen may be utilized for this purpose, and the shot size will be on the order of $5/32"$ to $3/16"$ diameter. With this arrangement each impulse of the pulsator mechanism 25 discharges the contents of its displacement unit 24 through line 26 into inlet 27 and thence upwardly at increased velocity under the restriction of bushing 28 to strike the shot and associated settled solids supported on screen 31 with sufficient force to elevate them substantially. The pulsing interval is established to provide a period of free settling after each such elevating movement, and the loosening of the shot bed permits the heavier solids to work through the interstices and descend into or toward the bottom of extension member 6 for removal of the induced flow through line 12.

When the unit is started, feed is delivered into tank 3 without actuation of parts other than impeller 8 until it begins to overflow. The pulsating mechanism is then operated in the manner just described and each pulsation crowds suspended solids into the body of material in tank 5, moving under centrifugal influence, with the result that the density of such material is progressively increased until an equilibrium stage is reached. This causes the lighter constituents being carried in the centrifugal movement to rise to the surface and overflow, while the heavier constituents will settle into extension 6 by reason of the density and movement of the material in tank 5.

After the equilibrium stage is reached, an analysis of overflow will indicate the efficiency of the operation. If too much of the heavier constituent appears in the overflow product, it may be necessary to reduce the stroke of the pulsator mechanism 25 or the hydrostatic head in reservoir 14, or both. Such changes will permit more of the heavier constituent to come down by reason of less impedance to the natural settling properties and still maintain enough upcast flow to maintain a proper density condition in tank 3 to assure an adequate overflow of lighter constituents.

Once the final setting of the machine is made as aforesaid, the operation continues without further adjustment. It is desirable to have a variable speed drive on the impeller 8 which preferably comprises two blades at 180° as shown. The impeller will be rotated within the range of 5–60 r.p.m. and some initial adjustment will be required to determine the proper speed for a given type of pulp after the equilibrium stage is reached. Once this adjustment has been determined, the operation can continue without further adjustment.

Periodic sampling will indicate changed efficiency due to variations in feed content or similar causes and the required adjustments may be made without a shutdown as conditions require. However, if velocity changes are necessary, it will be necessary to stop and drain the machine to substitute one size bushing 23 for another. In such event, the other adjustments may be made when operation resumes.

It should be understood that different operational controls will be utilized in different treatments which a given machine performs. The machine may be operated alone or in series for the various purposes, and particularly in iron ore treatments, it will be preferable to utilize a first stage for desliming and to produce a coarse concentrate which may be ground and retreated to obtain a higher concentration. Such practices are illustrated in the following examples:

Test No. 1 illustrates a typical upgrading operation with the teeter bed eliminated.

Original feed, classifier overflow, minus 35 mesh.

Hematite iron ore. Feed ground in rod mill six minutes and deslimed.

Feed wash—1300 cc./min.
Back wash—2000 cc./min.
No overflow.
Super elevation—15".
20 r.p.m. on the impeller.
120 pulsations through discharge.
¼" Discharge plus closed discharge valve until cone or separating zone was fully charged. Discharge valve opened slightly for balance of test, as second orifice.
Running time one hour.

|  | Wt. | Percent Wt. | Percent Fe | Fe in feed | Percent Distribution |
|---|---|---|---|---|---|
| Concts | 4,809 | 43.05 | 60.80 | 26.17 | 55.63 |
| Cone Res | 2,553 | 22.85 | 49.40 | 11.29 | 24.00 |
| Tailings | 3,810 | 34.10 | 28.10 | 9.58 | 20.37 |
| Weight in grams | 11,172 | 100.00% |  | 47.04 | 100.00% |
| Concts.: |  |  |  |  |  |
| +65 mesh | 259 | 24.05 | 59.60 | 14.33 | 23.76 |
| +100 | 450 | 41.78 | 56.75 | 23.71 | 39.30 |
| +200 | 323 | 29.99 | 65.20 | 19.55 | 32.41 |
| +325 | 42 | 3.90 | 65.90 | 2.57 | 4.26 |
| −325 | 3 | .28 | 57.10 | .16 | .27 |
|  | 1,077 | 100.00% |  | 60.32 | 100.00% |

Test No. 2 is similar to Test No. 1; the original feed was deslimed but not preground before treatment.

Original feed Classifier overflow, minus 35 mesh.

Hematite iron ore.

Feed was run through machine for desliming, and to produce a rougher concentrate, to be retreated.

Feed wash—2700 cc./min.
Back wash—1020 cc./min.
No overflow.
¼" concentrates (2) orifices discharge.
20 r.p.m. on the impeller.
120 pulsations.
Super elevation—12 inches.
Running time two hours.

|  | Wt. | Percent Wt. | Percent Fe | Fe in feed | Percent Distribution |
|---|---|---|---|---|---|
| Cleaner Concts | 5,310 | 9.41 | 54.00 | 5.08 | 15.13 |
| Cone Residue | 2,493 | 4.42 | 38.70 | 1.71 | 5.09 |
| Cleaner Tailings | 18,765 | 33.24 | 32.44 | 10.78 | 32.09 |
| Slime Tailings | 29,882 | 52.93 | 30.26 | 16.02 | 47.69 |
| Weight in grams | 56,450 | 100.00% |  | 33.59 | 100.00% |

Screen analysis of the cleaner cell concentrates:

|  | Wt. | Percent Wt. | Percent Fe | Fe in feed | Percent Dist. |
|---|---|---|---|---|---|
| +65 mesh | 23 | 3.70 | 30.20 | 1.12 | 2.07 |
| +100 | 93 | 14.95 | 35.00 | 5.23 | 9.65 |
| +150 | 215 | 34.57 | 51.50 | 17.80 | 32.85 |
| +200 | 187 | 30.06 | 63.00 | 18.94 | 34.96 |
| +325 | 100 | 16.08 | 66.35 | 10.67 | 19.69 |
| −325 | 4 | .64 | 65.90 | .42 | .78 |
|  | 622 | 100.00 |  | 54.18 | 100.00 |

Test No. 3 illustrates a two stage concentration with the teeter bed installed in the jig. The deslimed, rougher concentrate of the first stage was ground before retreatment at the second stage.

Original feed Classifier overflow, minus 35 mesh.

Hematite iron ore.

Feed was run through machine for desliming, and to produce a rougher concentrate, to be retreated.

Pulsator _____ 120
R.p.m. (impeller) _____ 26
Feed wash _____cc./min.__ 2000
Back wash _____cc./min.__ 1100
Super elevation _____inches__ 3
No overflow.
Running time _____hours__ 7.5

|  | Wt. | Percent Wt. | Percent Fe | Fe in feed | Percent Distribution |
|---|---|---|---|---|---|
| Rougher Concts | 27,852 | 41.90 | 36.44 | 15.27 | 60.72 |
| Slime tailings | 38,622 | 58.10 | 17.00 | 9.88 | 39.28 |
|  | 66,474 | 100.00 |  | 25.15 | 100.00 |

Rougher Concentrates, 27,852 grams, was ground in Rod Mill for six minutes, and retreated.

Pulsator _____ 120
R.p.m. (impeller) _____ 26
Feed wash _____cc./min.__ 2000
Back wash _____cc./min.__ 1100
Super elevation _____inches__ 10
No overflow.
Running time _____hours__ 2.5

For this example test. Screen and shot bed were added to the machine.

|  | Wt. | Percent Wt. | Percent Fe | Fe in feed | Percent Dist. |
|---|---|---|---|---|---|
| Cleaner Cell Concentrates | 8,150 | 12.26 | 59.60 | 7.31 | 29.07 |
| Cleaner Cell Cone Residue | 3,252 | 4.89 | 46.20 | 2.26 | 8.99 |
| Cleaner Cell Tailings | 16,450 | 24.75 | 23.03 | 5.70 | 22.66 |
| Slimes Tails (as above) | 38,622 | 58.10 | 17.00 | 9.88 | 39.28 |
|  | 66,474 | 100.00 |  | 25.15 | 100.00 |

In another series of tests to demonstrate the effectiveness of the jig in desliming operations, comparisons were undertaken between different rates of backwash flow and as to the effect of the teeter bed in such operations. The results of these tests follow:

Test No. 4 used backwash in the amount of 310 cc./min. and produced a tailing having only 1.77% by weight in the +325 mesh sizes and 98.23% in the −325 mesh sizes.

Original feed classifier overflow, minus 35 mesh.

Hematite iron ore.

Using the machine as deslimer:

Pulsator _____ 56
R.p.m. (impeller) _____ 8¾
Feed wash _____ 1100 cc./min.
Back wash _____ 1280 cc./min.

Overflow _____ 970 cc./min. flowed to waste through overflow.
Backwash used _____ 310 cc./min.
Super elevation _____ 1½".
Discharge _____ 1".
Running time _____ 1 hour and 27 minutes.
No shot bed used.

|  | Wt. | Percent Wt. | Percent Fe | Fe in feed | Percent Distribution |
| --- | --- | --- | --- | --- | --- |
| Concentrates | 2,265 | 26.49 | 29.20 | 7.74 | 30.98 |
| Cone Residue | 3,850 | 45.03 | 23.80 | 10.72 | 42.92 |
| Tailings plus 325 mesh | 43 | .50 | 11.50 | .06 | .24 |
| Tailings minus 325 mesh | 2,392 | 27.98 | 23.10 | 6.46 | 25.86 |
|  | 8,550 | 100.00 |  | 24.98 | 100.00 |

Screen analysis of tailings gave the following results:

|  | Wt. | Percent Wt. |
| --- | --- | --- |
| Tailings plus 325 mesh | 43 | 1.77 |
| Tailings minus 325 mesh | 2,392 | 98.23 |
|  | 2,435 | 100.00 |

Test No. 5 using the same type of ore as in Test No. 4 utilized a back wash flow of 1,400 cc./min. through teeter bed from 3" super elevation caused more +325 mesh sizes into tailings.

Pulsator _____ 56.
R.p.m. (impeller) _____ 8¾.
Feed wash _____ 1100 cc./min.
Back wash _____ 1400 cc./min.
Overflow _____ None.
Super elevation _____ 3".
Discharge _____ 1".
Running time _____ 1 hour and 40 minutes.

|  | Wt. | Percent Wt. | Percent Fe | Fe in feed | Percent Distribution |
| --- | --- | --- | --- | --- | --- |
| Concentrates | 3,907 | 43.19 | 28.45 | 12.29 | 49.16 |
| Cone Residue | 340 | 3.76 | 29.30 | 1.10 | 4.40 |
| Tailings plus 325 mesh | 1,058 | 11.70 | 11.40 | 1.33 | 5.32 |
| Tailings minus 325 mesh | 3,740 | 41.35 | 24.85 | 10.28 | 41.12 |
| Weight in grams | 9,045 | 100.00% |  | 25.00 | 100.00% |

A part of the tailings used for screen analysis gave the following results.

|  | Wt. | Percent Wt. |
| --- | --- | --- |
| Tailings plus 325 mesh | 62 | 22.05 |
| Tailings minus 325 mesh | 219 | 77.94 |
|  | 281 | 100.00 |

In Test No. 6, using a 4½" super elevation and a backwash flow of 2300 cc./min., a good concentration was noted with a 26.22 iron in feed upgraded to 41.15%.

Pulsator _____ 56.
R.p.m. (impeller) _____ 8¾.
Feed wash _____ 1280 cc./min.
Back wash _____ 2300 cc./min.
Overflow _____ None.
Super elevation _____ 4½".
Discharge _____ 1".
Running time _____ 1 hour and 15 minutes.

|  | Wt. | Percent Wt. | Percent Fe | Fe in feed | Percent Distribution |
| --- | --- | --- | --- | --- | --- |
| Concentrates | 3,977 | 33.33 | } 41.15 | 14.89 | 56.79 |
| Cone Residue | 341 | 2.86 |  |  |  |
| Tailings +325 M | 2,841 | 23.81 | 15.35 | 3.65 | 13.92 |
| Tails minus 325 | 4,773 | 40.00 | 19.20 | 7.68 | 29.29 |
| Weight in grams | 11,932 | 100.00% |  | 26.22 | 100.00% |

Screen analysis of tailings gave the following results.

|  | Wt. | Percent Wt. |
| --- | --- | --- |
| Tailings plus 325 mesh | 2,841 | 37.31 |
| Tailings minus 325 M | 4,773 | 62.69 |
|  | 7,614 | 100.00 |

In order to facilitate draining of tank 5 as when interchanging bushings 28 or for repair and adjustment of parts, a plug 35 is located in the extension portion 6, preferably above the teeter bed as shown in Fig. 2, so that the solids of the pulp will not pack the bed of shot 32 as the pulp is withdrawn. Obviously a petcock arrangement may be substituted if desired.

It will be apparent from the foregoing examples that the practice of the present invention may be adapted to a variety of treatments and adequate controls are provided in the machine to produce a product of required character. Since there will be considerable variation in the properties of an ore of a given type and widespread variations between ores of different types, initial testing will be necessary to determine the proper controls for a given treatment. Thereafter, slight variation in the controls as previously described will suffice to maintain the operation at maximum efficiency.

I claim:

1. Apparatus for the treatment of solids in liquids comprising a tank for pulp having a top overflow for lighter particles and a bottom discharge outlet for heavier particles, means for delivering a pulp to be treated into the upper portion of the tank at a point below the overflow level, a rotary impeller for imparting centrifugal movement to pulp in the tank, a hollow member disposed in pressure-confining relation to the discharge outlet and extending downwardly therefrom for a substantial distance, pressure-confining means for removing settled solids from the lower end of said hollow member in an induced flow, separator means disposed in the hollow member intermediate its ends, a hydraulic pulsator in communicating connection with the hollow member below the separator means for directing liquid in a pulsating flow upwardly through the separator and into the tank, and means associated with said hollow member for varying the volume of liquid directed through the separator and into the tank.

2. Apparatus for the treatment of solids in liquids comprising a tank for pulp having a top overflow for lighter particles and a bottom discharge outlet for heavier particles, means for delivering a pulp to be treated into the upper portion of the tank at a point below the overflow level, a rotary impeller for imparting centrifugal movement to pulp in the tank, a hollow member disposed in pressure-confining relation to the discharge outlet and extending downwardly therefrom for a substantial distance, pressure-confining means for removing settled solids from the lower end of said hollow member in an induced flow, separator means disposed in the hollow member intermediate its ends, a hydraulic pulsator in communicating connection with the hollow member below the separator means for directing liquid in a pulsating flow upwardly through the separator and into the tank and means associated with said hollow member for varying the velocity of liquid directed through the separator and into the tank.

3. Apparatus for the treatment of solids in liquids comprising a tank for pulp having a top overflow for lighter particles and a bottom discharge outlet for heavier particles, means for delivering a pulp to be treated into the upper portion of the tank at a point below the overflow level, a variable-speed rotary impeller for imparting centrifugal movement to pulp in the tank, a hollow member disposed in pressure-confining relation to the discharge outlet and extending downwardly therefrom for a substantial distance, pressure-confining means for removing settled solids from the lower end of said hollow member, separator means disposed in the hollow member intermediate its ends, a hydraulic pulsator in communicating connection with the hollow member below the separator means for directing liquid in a pulsating flow upwardly through the separator and into the tank, and means associated with said hollow member for varying the volume of liquid directed through the separator and into the tank.

4. Apparatus for the treatment of solids in liquids comprising a tank for pulp having a top overflow for lighter particles and a bottom discharge outlet for heavier particles, means for delivering a pulp to be treated into the upper portion of the tank at a point below the overflow level, a rotary impeller for imparting centrifugal movement to pulp in the tank, a hollow member communicating with the discharge outlet and extending downwardly therefrom for a substantial distance, means, including a pump, for removing settled solids from the lower end of said hollow member, separator means disposed in the hollow member intermediate its ends, a hydraulic pulsator in communicating connection with the hollow member below the separator means for directing a pulsating flow through the separator and into the tank, and means associated with said hollow member for varying the volume of liquid directed through the separator and into the tank.

5. Apparatus for the treatment of solids in liquids comprising a tank for pulp having a top overflow for lighter particles and a bottom discharge outlet for heavier particles, means for delivering a pulp to be treated into the upper portion of the tank at a point below the overflow level, a rotary impeller for imparting centrifugal movement to pulp in the tank, a hollow member disposed in pressure-confining relation to the discharge outlet and extending downwardly therefrom for a substantial distance, pressure-confining means for removing settled solids from the lower end of said hollow member, separator means including a screen and a bed of shot on the screen disposed in the hollow member intermediate its ends, a hydraulic pulsator in communicating connection with the hollow member below the separator means for directing liquid in a pulsating flow upwardly through the separator and into the tank under sufficient force to elevate the shot, and means associated with said hollow member for varying the volume of liquid directed through the separator and into the tank.

6. Apparatus for the treatment of solids in liquids comprising a tank for pulp having a top overflow for lighter particles and a bottom discharge outlet for heavier particles, means for delivering a pulp to be treated into the upper portion of the tank at a point below the overflow level, a rotary impeller for imparting centrifugal movement to pulp in the tank, a hollow member disposed in pressure-confining relation to the discharge outlet and extending downwardly therefrom for a substantial distance, pressure-confining means for removing settled solids from the lower end of said hollow member, separator means disposed in the hollow member intermediate its ends, a hydraulic pulsator in communicating connection with the hollow member below the separator means for directing liquid in a pulsating flow upwardly through the separator and into the tank, and means including an interchangeable orifice positioned in the hollow member between said separator and said pulsator connection and arranged to provide a selective velocity flow into the separator.

7. Apparatus for the treatment of solids in liquids comprising a tank for pulp having a top overflow for lighter particles and a bottom discharge outlet for heavier particles, means for delivering a pulp to be treated into the upper portion of the tank at a point below the overflow level, a rotary impeller for imparting centrifugal movement to pulp in the tank, a hollow member disposed in pressure-confining relation to the discharge outlet and extending downwardly therefrom for a substantial distance, pressure-confining means for removing settled solids from the lower end of said hollow member, separator means disposed in the hollow member intermediate its ends, an adjustable stroke hydraulic pulsator in communicating connection with the hollow member below the separator means for directing liquid in a pulsating flow upwardly through the separator and into the tank, and means associated with said hollow member for varying the volume of liquid directed through the separator and into the tank.

8. Apparatus for the treatment of solids in liquids comprising a tank for pulp having a top overflow for lighter particles and a bottom discharge outlet for heavier particles, means for delivering a pulp to be treated into the upper portion of the tank at a point below the overflow level, a rotary impeller for imparting centrifugal movement to pulp in the tank, a hollow member disposed in pressure-confining relation to the discharge outlet and extending downwardly therefrom for a substantial distance, pressure-confining means for removing settled solids from the lower end of said hollow member, separator means disposed in the hollow member intermediate its ends, a hydraulic pulsator in communicating connection with the hollow member below the separator means for directing liquid in a pulsating flow upwardly through the separator and into the tank, a reservoir supplying liquid to the pulsator having a liquid level substantially above the overflow level in the tank, and means for varying the liquid level in the reservoir so as to vary the volume of flow initiated by the pulsation.

9. Apparatus as defined in claim 5 in which the screen is 10 mesh and the shot is approximately $5/16$ inch diameter size.

10. The method of recovering iron constituents of taconite ores and the like, which comprises forming an aqueous pulp of taconite ore of —10 mesh or finer sizes, introducing the pulp into the upper portion of a confined treatment zone of substantial vertical extent, subjecting material in the upper portion of said confined zone to a centrifugal movement, inclusive of an overflow of rock constituents from the surface of said material, increasing the density of material in said centrifugal movement until an equilibrium is reached causing rock constituents to pass to the surface and iron constituents to descend by gravity to the lower limits of the vertical zone, impeding said gravitational descent by maintaining a screen and a bed of shot thereon across the zone intermediate its ends, removing settled iron from the lower end of the vertical zone by an induced flow, and directing hydraulic pulsations upwardly through the zone from a point between the screen and the point of iron removal so as to intermittently elevate the shot and associated solids from the screen and crowd high specific gravity constituents into the centrifugal material, the interval between pulsations being long enough to permit a free settling of iron constituents throughout the vertical extent of said zone below the centrifugal material and to let the shot come to rest on the screen.

11. The method of recovering iron constituents of taconite ores and the like, which comprises forming an aqueous pulp of taconite ore of —10 mesh or finer sizes, introducing the pulp into the upper portion of a confined treatment zone of substantial vertical extent, subjecting material in the upper portion of said confined zone to a centrifugal movement, inclusive of an overflow of rock constituents from the surface of said material, increasing the density of material in said centrifugal movement until an equilibrium is reached causing rock constituents to pass to the surface and iron constituents to descend by gravity to the lower limits of the vertical zone, impeding said gravitational descent by maintaining a screen and a bed of shot thereon across the zone intermediate its ends, removing settled iron from the lower end of the vertical zone by an induced flow, directing hydraulic pulsations upwardly through the zone from a point between the screen and the point of iron removal so as to intermittently elevate the shot and associated solids from the screen and crowd high specific gravity constituents into the centrifugal material, the interval between pulsations being long enough to permit a free settling of iron constituents throughout the vertical extent of said zone below the centrifugal material and to let the shot come to rest on the screen, and varying the velocity of flow in the hydraulic pulsations in accordance with the settling rate of the iron.

12. The method of recovering iron constituents of taconite ores and the like, which comprises forming an aqueous pulp of taconite ore of −10 mesh or finer sizes, introducing the pulp into the upper portion of a confined treatment zone of substantial vertical extent, subjecting material in the upper portion of said confined zone to a centrifugal movement, inclusive of an overflow of rock constituents from the surface of said material, increasing the density of material in said centrifugal movement until an equilibrium is reached causing rock constituents to pass to the surface and iron constituents to descend by gravity to the lower limits of the vertical zone, impeding said gravitational descent by maintaining a screen and a bed of shot thereon across the zone intermediate its ends, removing settled iron from the lower end of the vertical zone by an induced flow, directing hydraulic pulsations upwardly through the zone from a point between the screen and the point of iron removal so as to intermittently elevate the shot and associated solids from the screen and crowd high specific gravity constituents into the centrifugal material, the interval between pulsations being long enough to permit a free settling of iron constituents through the vertical extent of said zone below the centrifugal material and to let the shot come to rest on the screen, and varying the volume of flow in the hydraulic pulsations in accordance with the settling rate of the iron.

13. The method of classifying solids in liquids which comprises forming an aqueous ore pulp containing a plurality of solids constituents of different specific gravity and in finely divided condition, introducing the pulp into the upper portion of a confined treatment zone of substantial vertical extent, subjecting material in the upper portion of said confined zone to a centrifugal movement, inclusive of an overflow of lighter constituents from the surface of said material, increasing the density of material in said centrifugal movement until an equilibrium is reached causing lighter constituents to pass to the surface and coarser constituents to descend by gravity to the lower limits of the vertical zone, impeding said gravitational descent by directing hydraulic pulsations upwardly through the zone so as to crowd high specific gravity constituents into the centrifugal material, the interval between pulsations being long enough to permit free settling of heavier constituents throughout the vertical extent of said zone, removing settled solids from the lower end of the vertical zone by an induced flow, and changing the force of the pulsations directed against the material in centrifugal movement in relation to a determination of the quantity of coarser constituents in the overflow products.

14. The method of classifying solids in liquids which comprises forming an aqueous ore pulp containing a plurality of solids constituents of different specific gravity and in finely divided condition, introducing the pulp into the upper portion of a confined treatment zone of substantial vertical extent, subjecting material in the upper portion of said confined zone to a centrifugal movement, inclusive of an overflow of lighter constituents from the surface of said material, increasing the density of material in said centrifugal movement until an equilibrium is reached causing lighter constituents to pass to the surface and coarser constituents to descend by gravity to the lower limits of the vertical zone, impeding said gravitational descent by directing hydraulic pulsations upwardly through the zone so as to crowd high specific gravity constituents into the centrifugal material, the interval between pulsations being long enough to permit free settling of heavier constituents throughout the vertical extent of said zone, removing settled solids from the lower end of the vertical zone by an induced flow, and changing the force of the pulsations directed against the material in centrifugal movement in relation to a determination of the sizes of the constituents in the overflow product.

References Cited in the file of this patent
UNITED STATES PATENTS

| | | |
|---|---|---|
| 1,151,722 | Schiechel | Aug. 31, 1915 |
| 1,895,505 | Wuensch | Jan. 31, 1933 |
| 2,064,109 | Hadsel | Dec. 15, 1936 |
| 2,242,020 | Wood | May 13, 1941 |
| 2,466,120 | Nawman | Apr. 5, 1949 |